US010240702B2

(12) United States Patent
Brown (10) Patent No.: US 10,240,702 B2
(45) Date of Patent: Mar. 26, 2019

(54) LOWER EFFORT QUICK-CONNECT COUPLER

(71) Applicant: Gregory James Brown, De Winton (CA)

(72) Inventor: Gregory James Brown, De Winton (CA)

( * ) Notice: Subject to any disclaimer, the term of this patent is extended or adjusted under 35 U.S.C. 154(b) by 212 days.

(21) Appl. No.: 15/293,243

(22) Filed: Oct. 13, 2016

(65) Prior Publication Data

US 2018/0106409 A1    Apr. 19, 2018

Related U.S. Application Data

(63) Continuation-in-part of application No. 14/281,721, filed on May 19, 2014, now Pat. No. 9,534,699.

(51) Int. Cl.
*F16L 37/42*        (2006.01)

(52) U.S. Cl.
CPC .................................. *F16L 37/42* (2013.01)

(58) Field of Classification Search
CPC .... F16K 15/00; F16K 1/18; F16K 1/20; F16L 37/42; Y10T 137/7854; Y10T 137/7856; Y10T 137/7898; Y10T 137/7909; Y10T 137/7901; Y10T 137/78
USPC ..... 600/579; 251/149.3, 149.2, 149.1, 149.8, 251/149.5, 151, 82, 148, 341, 346, 339, 251/349
See application file for complete search history.

(56) References Cited

U.S. PATENT DOCUMENTS

| 2,518,299 | A | * | 8/1950 | Fernandez | F25B 41/003 137/15.09 |
| 3,127,148 | A | * | 3/1964 | Collar | F16L 29/007 137/527 |
| 3,285,627 | A | * | 11/1966 | Kozulla | F16K 15/144 251/149.2 |
| 4,123,089 | A | * | 10/1978 | Viero | F16L 37/084 137/329.1 |
| 4,586,694 | A | * | 5/1986 | Jones | F16L 37/38 251/149.2 |
| 4,856,823 | A | * | 8/1989 | Heren | F16L 37/084 137/533.17 |
| 4,877,219 | A | * | 10/1989 | Yano | F16L 37/23 251/149.2 |

(Continued)

*Primary Examiner* — Marina A Tietjen
*Assistant Examiner* — Frederick D Soski (57) ABSTRACT

A sealing member, whose unique manner of movement provides an improvement to a quick-connect valve assembly, for fluid control. A coupling force, required to couple the quick-connect valve assembly containing the improvements, is substantially reduced, resulting in an improvement to a typical quick-connect valve assembly (prior-art). The quick-connect valve assembly is comprised of at least a male coupler, a female coupler and a sealing member. During the resultant coupling of the quick-connect assembly, the sealing member, is firstly moved, in a rotational manner and then secondly, if desired, in a more typical translational manner. Multiple options for implementation of these improvements are available utilizing typical quick-connect valve components. The implementation options include; individual component replacement, upgrading of prior-art components or introduction of new components. All implementation options provide the improvement of a substantially reduced coupling force.

3 Claims, 9 Drawing Sheets

(56) References Cited

U.S. PATENT DOCUMENTS

| | | | | |
|---|---|---|---|---|
| 5,044,401 | A * | 9/1991 | Giesler | F16L 37/32 137/614.03 |
| 5,613,663 | A * | 3/1997 | Schmidt | A61M 39/26 251/149.2 |
| 5,725,516 | A * | 3/1998 | Cook | A61M 1/0001 600/581 |
| 5,787,927 | A * | 8/1998 | Johnson | F16L 37/23 137/614.02 |
| 6,161,578 | A * | 12/2000 | Braun | F16L 37/0841 137/614.03 |
| 6,978,800 | B2 * | 12/2005 | deCler | F16K 15/026 137/538 |
| 7,481,243 | B2 * | 1/2009 | Michaels | A61M 1/0001 137/892 |
| 7,631,660 | B2 * | 12/2009 | deCler | A61M 39/18 137/614.03 |
| 2006/0108556 | A1 * | 5/2006 | Rose | F16K 15/20 251/149.8 |
| 2010/0044609 | A1 * | 2/2010 | Matsubara | F16K 15/026 251/149 |

\* cited by examiner

FIG. 1

PRIOR-ART

FIG. 2

PRIOR-ART

FIG. 3

PRIOR-ART

LOWER EFFORT QUICK-CONNECT COUPLER

BACKGROUND OF THE INVENTION

The design functionality of a typical quick-connect valve assembly (prior-art) utilizes other commercially-available standard components where some, although not all, components are necessary for the new design to function. The typical quick-connect valve assembly may also be referred to as a quick-disconnect coupler, or a quick disconnect coupler, or a quick-disconnect, or in other similar ways. The typical quick-connect valve assembly components are detailed and labeled in FIGS. 1 to 3. In particular, two components from pre-existing commercially available designs are utilized herein in order to ensure a practical and functioning typical quick-connect valve assembly: 1) a radial "seal" between a typical male coupler 203 and a typical female coupler 204 and, 2) a "stop and lock" or "lock" that restricts engagement and locks the typical male coupler and the typical female coupler together under full engagement of the typical quick-connect valve assembly. The term "typical" is utilized in naming prior-art components throughout this specification.

Typical quick-connect valve assemblies are in widespread use for reliably joining fluid transfer lines, gas transfer lines and pneumatic transfer lines. Generally, an automatic shut-off value (a check valve) is incorporated, commonly called a direct response valve. A typical sealing member (prior-art) acts as the direct response valve and hence eliminates the need for a separate shut-off valve that would have to be actuated prior to the uncoupling process. Hence the purpose of the direct response valve utilized within the typical quick-connect valve assembly is to eliminate undesirable leakage during disengagement (uncoupling). Typical quick-connect valve assemblies use many variations of locking mechanisms to automatically lock the two male and female components together so the user avoids needing to manually hold the two components of the coupler together while fluid is flowing, thus supporting practicability. The methods of locking are varied and numerable. The type of locking features utilized in the quick-connect valve assembly is not of material relevance to this discussion due to the fact that any manner of locking is merely to provide convenience to the user.

Figure 1:
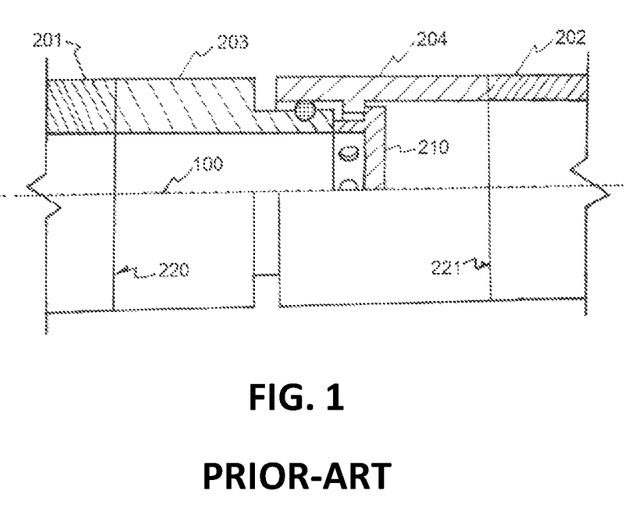
FIG. 1 is prior-art and is a block view in partial section of the typical quick-connect valve assembly.
Figure 2:
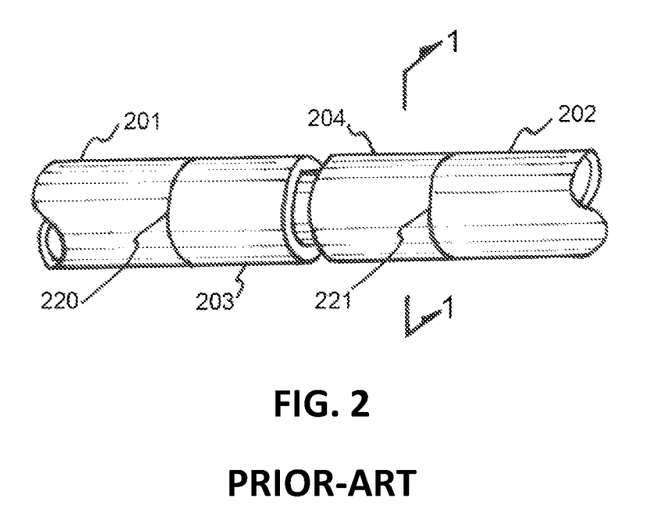
FIG. 2 is prior-art and is an external view of the typical quick-connect valve assembly as shown in FIG. 1.
Figure 3:
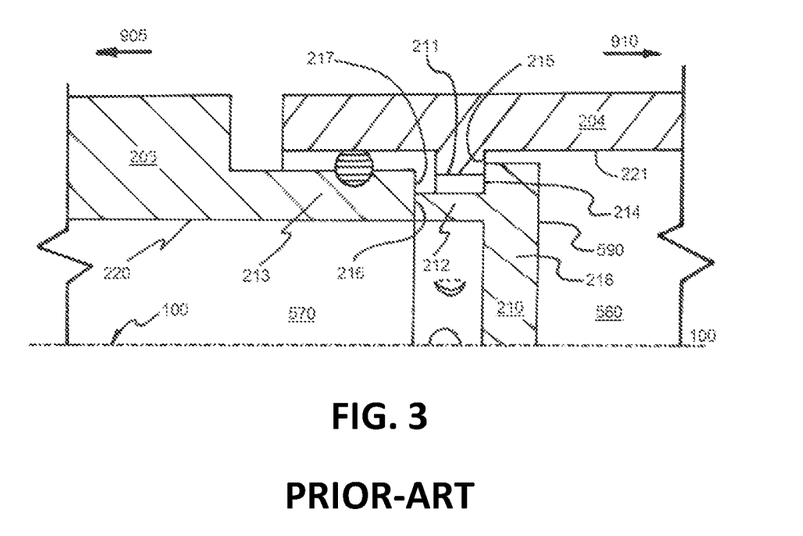
FIG. 3 is prior-art and is a sectional view of the typical quick-connect valve assembly taken along section 1-1 of FIG. 2.

In addition, this type of direct response valve contains some form of the typical sealing member (prior-art) which is commonly contained within in the typical female coupler (prior-art) and this component can take many different shapes. The primary features of the design of the direct response valve shown in FIG. 1 through FIG. 3 are that: 1) it must comprise a smaller size than the central chamber of the typical female coupler 221 and, 2) the typical sealing member 210 sealing surface 214 must closely match in a circumferential manner the same axial shape of sealing surface 215 of the mating female coupler 204. The joining of surfaces 214 and 215 provides a typical fluid seal. In practice, the typical fluid seal is accomplished by utilizing detailed readily available forms and shapes and materials and can be manufactured from a separate and pliable rubber material or a hard material, though, the typical fluid seal material is in practice much more deformable than the parent female and male bodies, in order to ensure that sealing occurs.

A typical radial seal is required that creates a seal between the outer portion of the typical male coupler's smaller end 213 and the inner diameter of the typical female coupler 204 in order to prevent fluid communication out of the assembly, which is commonly referred to as a "leak". So in practice the typical radial seal also ensures that the typical quick-connect valve assembly functions and hence fluid flows between the typical female coupler and the typical male coupler only and does not "leak" out of the assembly.

In the past, a number of typical quick-connect valve assemblies have utilized a typical direct response valve, whereby the typical sealing member is caused to open by the insertion of the typical male coupler 203 and the resultant axial movement 910 of the typical sealing member 210 (assuming that the typical female coupler 204 remains stationary herein unless otherwise specified). In typical designs, the upstream surface of the typical male coupler (prior-art) 217 (which is of uniform height in the axial direction 910) communicates with the raised surface 216 of the typical sealing member 210, thus causing the typical sealing member 210 to translate in a purely-axial manner (where no rotation occurs). Hence the typical sealing member 210 and the typical male coupler 203 move together (in tandem) in direction 910.

Prior-art direct response valves' (also referred to as check valves; said typical direct response valve) are disclosed in Applicant's previous U.S. Pat. Nos. 8,561,640 B2; 5,005,602; 4,712,575; 4,776,369; 7,334,603; 6,978,800 and 8,596,560 B2. These prior-art disclosures incorporate only a purely-axial movement of the typical sealing member, relative to the direct response valve body (titled the typical quick-connect valve assembly above). In other words, these prior-art disclosures state that the sealing surfaces' (of the typical sealing member) move the same amount, providing a uniform circumferential opening at all locations between the sealing surfaces. Since the typical sealing member is translating purely-axially against the resisting fluid pressure (contained within the central chamber of the female body), this means that the required magnitude of a typical coupling force is determined by the multiplication of the resisting fluid pressure times the entire resisting surface of the typical sealing member; dissimilar to this invention.

Prior-art direct response valves (also referred to as check valves; said typical direct response valve) are disclosed in Applicant's previous U.S. Pat. Nos. 6,622,205; 5,941,278; 7,533,693 and 5,117,514 and 5,725,516 and 7,481,243 which incorporate only a pure rotational means of opening said typical direct response valve and utilize various styles of sealing members with a fixed rotational movement and also with a mechanical pivot, hence such elements are distinctly different than those in this submission. In addition, prior-art valves are not pure inline direct response (check) valves, as in this submission, although these prior-art valves may be used as the check valve in their engaged positions.

Prior-art direct response valves' (also referred to as check valves; said typical direct response valve) are disclosed in Applicant's previous U.S. Pat. No. 5,501,427(251/228); 4,620,015 and 4,561,630 and all provide a variety of both typical sealing member physical rotation and the typical sealing member physical translational aspects in their designs; although all of these prior-art submissions incorporate dramatically different mechanism design elements in order to facilitate their sealing member's rotational and axial movements. All prior-art submissions incorporate various combinations of the following elements, in order to create the rotation and translation of their sealing member(s), including: a) complex mechanisms, pivots, levels, cams, wheels, latches and b) sliding, movably connected, pressure trips, lost motion and slides. The prior-art submissions are dramatically different than the current submission since prior-art submissions utilize the above stated elements to facilitate rotation and translation whereas, this invention and the sealing member movement is initiated in a unique manner from previous methods. In addition Applicant U.S. Pat. No. 5,620,015 is specially designed for use as a pipe end valve only and is not considered a pure direct response valve due to the mechanisms utilized in its design. Applicant U.S. Pat. No. 5,501,427 is specifically intended as a shut-off and flow regulation valve and is not said direct response valve in its disengaged position. Lastly, applicant U.S. Pat. No. 4,561,630 is specifically intended as an extended period shut-off valve and is not said direct response valve in its disengaged position.

Prior-art direct response valves (also referred to as check valves; said typical direct response valve) are disclosed in Applicant's previous U.S. Pat. No. 8,348,661 which incorporate true rotation of the typical sealing member about its longitudinal shaft axis only and no rotation of the typical sealing member occurs.

Prior-art direct response valves (also referred to as check valves; said typical direct response valve) are disclosed in Applicant's previous U.S. Pat. No. 5,044,401 contains a pliable sealing member with an angled surface although lacks a radial seal as claimed. In addition this prior-art also lacks a sealing member that in the fully open position is out of contact with the annular sealing surface as claimed. Also no reduction of the typical coupling force is made or implied as is claimed herein.

Prior-art direct response valves (also referred to as check valves; said typical direct response valve) are disclosed in Applicant's previous U.S. Pat. No. 4,877,219 contains a pivoting sealing member which remains in contact with the annular sealing surfaces at all times unlike what is claimed. In addition this prior-art lacks the special shaped sealing member as claimed.

BRIEF SUMMARY OF THE INVENTION

This invention relates to an improvement of the typical quick-connect valve assembly utilizing alternative configurations of component substitution or component addition. This invention of a quick-connect valve assembly is unique in that it is designed to ensure that a sealing member is firstly moved by a rotation and then secondly, if desired, by a translation further in the axial direction. The initial said rotation of the sealing member provides an advantage over prior-art designs (pure axial translation only) in that not all the resisting internal pressure needs to be overcome, during the coupling action, and this improvement results in a coupling force which is substantially less than the typical coupling force. As compared to prior-art submissions, this invention provides distinctive functional advantages, for use by humans by substantially reducing the coupling force. Due to the reduction in the coupling force the coupling time is reduced and hence the ease of use may also be improved.

A fluid channel opening of the direct response valve is initiated by the insertion of a male coupler into a female coupler which initially rotates the sealing member. The improvement can be incorporated into either the sealing member or the male coupler or into a new additional component. The improvement can be incorporated by either replacement of typical (prior-art) components with new improved components or by the modification of typical (prior-art) components. This improvement incorporates a constant dihedral angle D1, which is located either on the sealing member or on the male coupler or on a new additional component. At the outset a fluid seal exists between the surfaces of the sealing member and the surfaces of the female coupler. The constant dihedral angle D1 provides the means to ensure that the sealing member undergoes said rotation which initiates fluid communication from a central chamber of the female coupler into a second central chamber of the male coupler. After the rotation of the sealing member has been completed, the sealing member if desired is then translated further in a more typical translational (axial) manner thus improving the amount of fluid communication. If desired, the male and female coupler can be held together, in the coupled position, by the use of any commercially available locking mechanisms. Also, the fluid seal between the sealing member and the female coupler can be provided by commercially existing means such as flexible materials, O-ring's, precision machining or any other desired methods.

BRIEF DESCRIPTION OF THE DRAWINGS

FIGS. 8A, 8B and 8C are titled Position 2, Position 3, and Position 4 respectively.

FIGS. 11A, 11B and 11C are sectional views along section 4-4 of FIG. 9 showing three alternative configurations of the quick-connect valve assembly detailing the constant dihedral angle D1. FIGS. 11A and 11C detail the upgrade path by the replacement of the prior-art components with new components in order to achieve the required overall geometry of this improvement. FIG. 11B details the utilizing of all prior-art components with the introduction of one new component.

DETAILED DESCRIPTION OF THE DRAWINGS

FIG. 1 is prior-art and is a block view in partial section of the typical quick-connect valve assembly which incorporates the typical male coupler 203, the typical female coupler 204, the typical sealing member 210 and other typical components (a radial seal, tubes/hoses 201 and 202). The typical quick-connect valve assembly incorporates the typical sealing member 210 providing an integral valve function which belongs to the typical direct response valve class of valves. The typical quick-connect valve assembly is depicted in a closed state of a typical valve. The position and the style or type of the exact typical sealing member 210 shown is insignificant and FIG. 1 is simply displayed for comparison purposes only. FIG. 1 does not depict or represent the required elements of the invention claimed; rather it is included as a block diagram representation which will provide a basis and framework for more detailed elaboration. FIG. 1 also outlines the interfaces between typically utilized fluid transmission hoses 201/202 (tubes or pipes) that are connected to both ends of the typical quick-connect valve assemblies.

FIG. 2 is prior-art and is a view of the typical quick-connect valve assembly and other prior-art components which are only visible from an external view. Both the prior-art designs and this new design of quick-connect valve assemblies may appear similar from an external perspective.

FIG. 3 is prior-art and is a sectional view taken along section 1-1 of FIG. 2. The typical direct response valve is shown here so that the components and surfaces can be clearly seen. FIG. 3 also contains other components of the typical direct response valve, therefore demonstrating the basis upon which improvements to the typical sealing member of the typical direct response valve are made and described herein for this invention. The typical quick-connect valve assembly is depicted in the closed state of the typical valve.

The typical direct response valve incorporates the typical sealing member where all points on surface 214 and all points on surface 216 describe two distinct planes in space and whereas these two planes defined are in fact parallel planes. In other words, there is no intentional or substantial angle between the plane defined by surface 214 and the plane defined by surface 216 by design or in practice. However, there may be a small unintentional angle that exists between surface 214 and surface 216 due to manufacturing deviations and the tolerance of manufactured parts.

During physical engagement the typical male coupler 203 moves in direction 910 where the surface 217 of the typical male coupler 203 contacts surface 216 of the typical sealing member 210. The movement in direction 910 assumes that the typical female coupler 204 is stationary, although the reverse of this movement is also possible; where the typical female coupler 204 moves in direction 905 and the typical male coupler 203 is considered stationary. FIG. 3 depicts the position where the typical male coupler 203 has been inserted into the typical female coupler 204 at the exact position where there is full contact between the typical male coupler 203 and the typical sealing member 210; where surfaces 215 and 214 remain in full contact and hence FIG. 3 depicts the valve in the closed state of the typical valve. During the closed state of the typical valve a static pressure condition exists within internal central chamber 580.

Any further movement of the typical male coupler 203 and hence the typical sealing member 210 in direction 910 would result in surface 214 and 215 no longer being in contact with each other and hence the typical fluid seal is broken between surfaces 215 and 214, this would result in the valve now being in a partially-open state of the typical valve. In other words, this resultant seal break (between surface 214 and surface 215) results in a communication of fluid between the central chamber 580 and into central chamber 570. This communication of fluid continues to improve as the physical distance between surface 215 and surface 214 is increased and finally reaches a fully-opened state of the typical valve.

In the typical quick-connect valve assemblies, there is no intentional angle between surfaces 216 and 217 (being on parallel planes), hence the typical sealing member 210 moves only in an axial manner in direction 910 (or direction 905). Hence, there is no intentional or meaningful rotation of the typical sealing member 210 about the perpendicular to the axial direction during the valve opening process. In other words the typical sealing member remains coaxially aligned with the typical female coupler housing. Since there is no rotation of the typical sealing member in the typical design, the typical coupling force required to reach the partially-open state can be calculated as the static pressure in central chamber 580 multiplied by the area of surface 590. Surface 590 is the projected axial area of the upstream end of the sealing member 218. At the coupling position just prior to the partially-open state (of the typical valve) the typical coupling force is at its highest magnitude.

In the quick-connect valve assemblies the pressure which exists in central chamber 570 is, in practice, a smaller amount relative to the pressure which exists in the central chamber 580. The pressure in central chamber 570 is assumed to be a low value approaching atmospheric pressure, hence only the pressure in the central chamber 580 is of any significance.

Figure 4A:
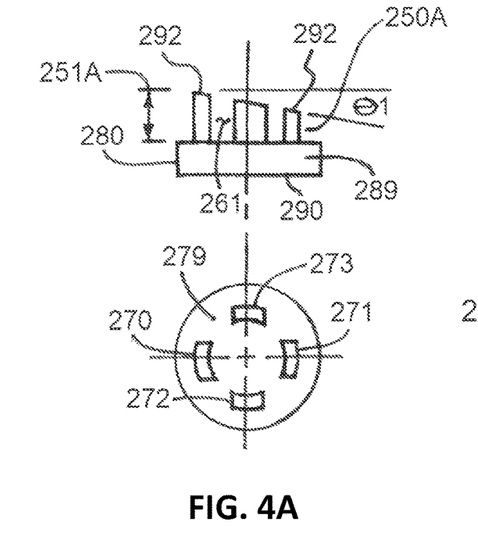
FIGS. 4A, 4B and 4C are the plan and side views of three alternative designs of the sealing members'.
Figure 4B:
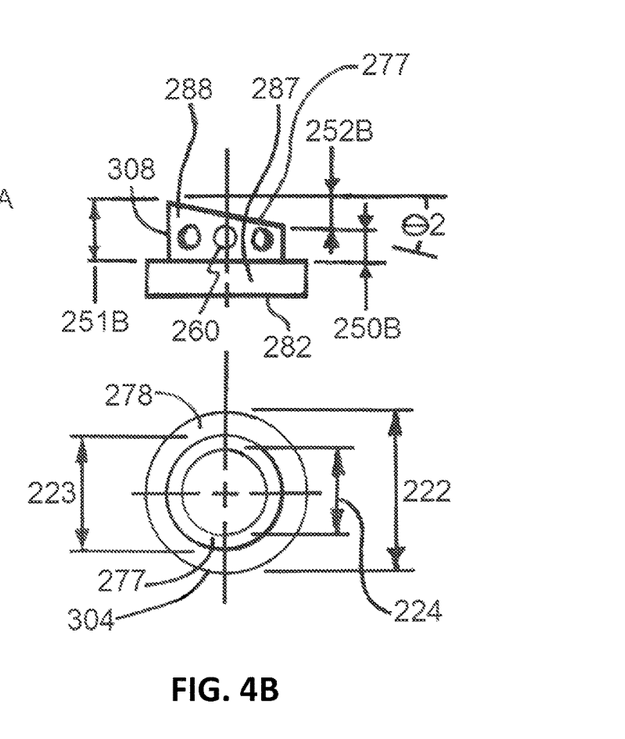
Figure 6:
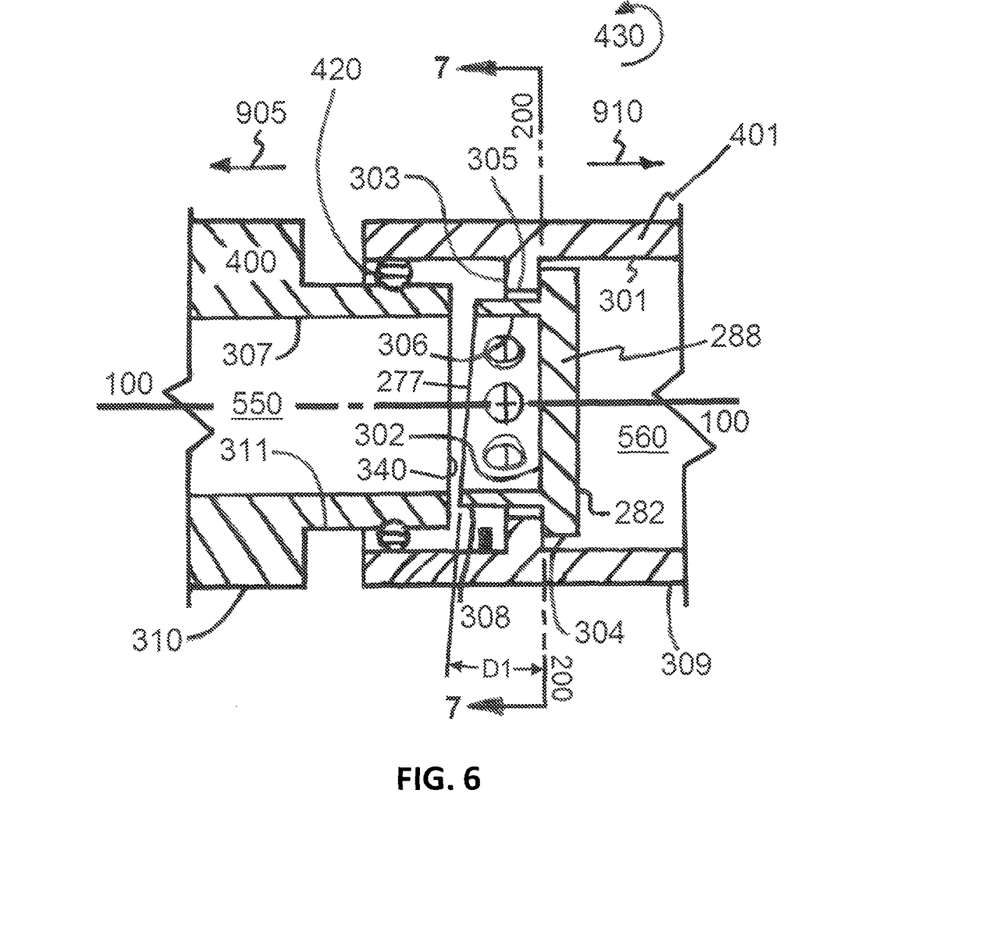
FIG. 6 is sectional view of the quick-connect valve assembly taken along section 4-4 of FIG. 9 incorporating one alternative of the sealing member. This view is titled Position 1.
Figure 9:
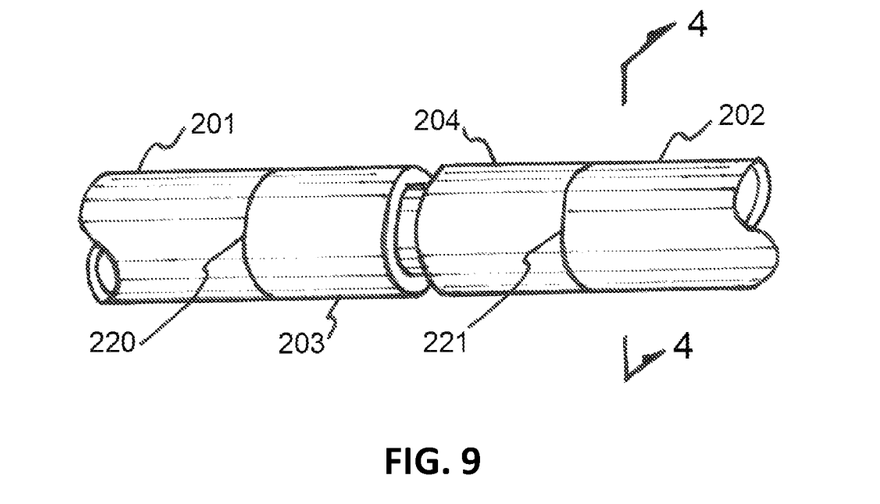
FIG. 9 is an external orthographic block view of the quick-connect valve assembly.

FIG. 6 is an magnified view in section taken along section 4-4 of FIG. 9, incorporating one alternative of the sealing member that is detailed in FIG. 4B. In FIG. 6, the sealing member is oriented in the position prior to any movement of the sealing member. FIG. 6 is titled Position 1 and depicts the male coupler 400 in its pre-contact position where no contact exists with the sealing member 288 and where the valve is also in the closed state of the valve. The constant dihedral angle D1 is also depicted. The sealing member design alternative of FIG. 4B is chosen only for simplification and ease of explanation, as its geometry is the most clearly displayed. As depicted in FIG. 6 the Direction 910 and Direction 905 are also defined as a upstream direction and a downstream direction, respectively. The downstream direction is the direction of fluid flow in the quick-connect valve assembly.

Figure 10:
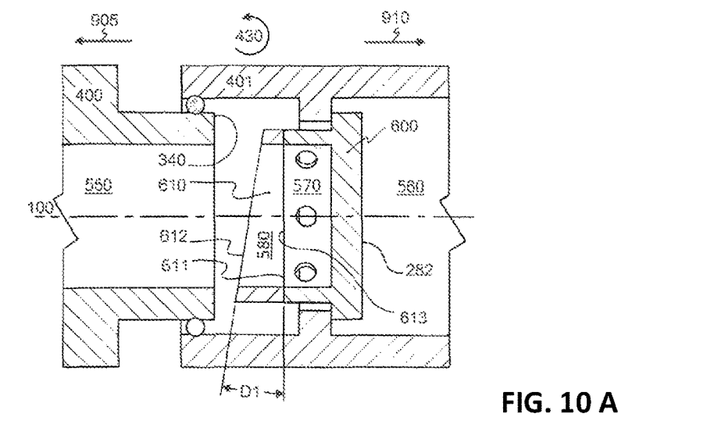
FIGS. 10A, 10B and 10C are sectional views along section 4-4 of FIG. 9 showing three alternative configurations of the quick-connect valve assembly detailing the constant dihedral angle D1. These figures detail the upgrade path, utilizing prior-art components with the addition of new components in order to achieve the required overall geometry of this improvement.

FIG. 6 depicts one alternative configuration where the constant dihedral angle D1 is located on the sealing member similar to FIGS. 10A and 11A. Alternative configurations where the constant dihedral angle D1 is located on other components are detailed in the descriptions of FIGS. 10B, 10C, 11B and 11C. The quick-connect valve assembly shown in FIG. 6 has two coupling components namely the male coupler and the female coupler, which are capable of being coupled together during a coupling process or detached from each other during a uncoupling process. The quick-connect valve assembly provides the means to ensure that the sealing member is firstly moved by rotation (about the perpendicular to the axial direction 100) and then secondly, if desired, moved in a more typical axial 100 translational direction 910. Following the initial rotational phase, the sealing member undergoes translation in an axial direction 910, although remains in its previously rotated position (by the amount of the constant dihedral angle D1). One primary function of the quick-connect valve assembly, which incorporates this direct response valve, is to provide a valve state change during operation. As detailed herein there are three particular states of said valve: closed, partially-open or fully-opened. The rotation and the translation of the sealing member provides the valve functionality of the direct response class of valves and hence opens internal fluid flow channels, providing fluid communication through the quick-connect valve assemblies said central chamber(s). The female coupler contains the central chamber 560 where one annular surface provides the sealing surface when in contact with the sealing member. An annular surface located on the upstream side of the sealing member provides the sealing surface when in contact with the female coupler.

Figure 4C:
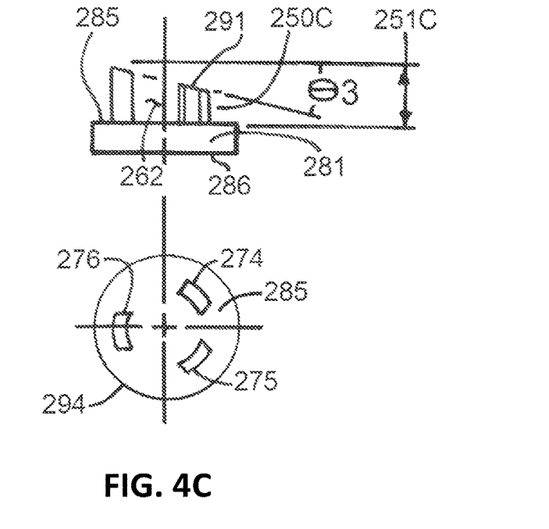

FIGS. 4A and 4C are two alternative designs of the sealing member, which contain unique features, namely the protruding members' which ensure that there is a constant dihedral angle Theta1 and a constant dihedral angle Theta3 between the downstream plane and the upstream planes, respectively. FIG. 4B depicts one alternative of utilizing a protruding solid body that is protruding from the sealing surface 278. A constant dihedral angle Theta1 ensures that the sealing member firstly rotates during the valve opening sequence. The constant dihedral angle labels: Theta1, theta2 and Theta3 utilized in FIGS. 4A, 4B and 4C and interchangeable with the constant dihedral angle D1 label which is utilized throughout this specification. The constant dihedral angle D1 ensures that the rotation of the sealing member occurs, during the coupling process.

FIG. 4A is the plan and side view of one alternative method of designing the sealing member 261. This alternative design incorporates four said protruding members', namely 270, 271, 272 and 273. The downstream ends' of these four said protruding members' define a flat plane, or surface 292—the downstream plane. The downstream plane is at the constant dihedral angle Theta1 relative to the upstream plane 279. An alternative design may also incorporate any quantity of said protruding members' as shown in FIG. 4C.

FIG. 4B is the plan and side view of a second alternative design of the sealing member 288. This design, does not have any distinct and separable said protruding member as compared to the alternative designs in FIGS. 4A and 4C. This second alternative design of the sealing member 288 incorporates the protruding solid body where the plane defined by the sealing surface 278 represents the upstream plane and where surface 277 represents the downstream plane. Where the constant dihedral angle Theta2, is defined by the relative difference between the upstream and the downstream planes. In FIG. 4B a sliced hollow cylindrical shape (SHCS), being a sub-set of the protruding solid body has been arbitrarily chosen in this embodiment. The SHCS contains an interior surface 306 and exterior surface 308 with the SHCS being attached at one end to surface 278. The interior surface 306 of the SHCS is defined by the interior diameter 224, and the outer surface 308 is defined by the exterior diameter 223. It is necessary in this second alternative design, that transverse holes be located on the SHCS component in order to accommodate fluid flow between the inner and outer surfaces of the SHCS component. The SHCS component in this example may also take an irregular or non-cylindrical shape, although it must also have some form of transverse holes 260.

FIG. 4C is the plan and side view of a third alternative design of the sealing member which incorporates three distinct and separate said protruding members', specifically 274, 275 and 276. The downstream ends' of three said protruding members' define surface 291—the downstream plane. The downstream plane (surface 291) is at the constant dihedral angle Theta3 relative to the upstream plane (the plane defined by surface 285).

As depicted in FIG. 4B [FIG. 4A; FIG. 4C] the sealing member will incorporate the high points 251b [251a; 251c] and the low points 250b [250a; 250c], which in turn defines the downstream plane and hence the constant dihedral angles Theta2 [Theta1; Theta3]. The circumferential location of the high point and the low point is not critical, although the high point and the low point should be approximately diametrically opposed. The dihedral angles Theta1, Theta2 and Theta3 can be utilized interchangeably with the constant dihedral angle D1 described throughout this specification.

Any alternative chosen shape of the SHCS must also incorporate the following interference requirements: a) during operation, surface 308 must not interfere with the interior surface 305 (see FIG. 6.) of the female coupler body 288, as the sealing member rotates and/or translates and, b) during operation, surface 304 must not interfere with the female coupler (and the interior diameter of the central chamber 560 of FIG. 6) as defined by surface 301, as the sealing member rotates and/or translates during operation. All of the afore mentioned interference requirements are also applicable for all alternative designs depicted by FIG. 4A and FIG. 4C, where the external radial surfaces of the protruding member (as a system) comprises the elements which must not interfere with surface 305 (see FIG. 6). In addition, similar interference requirements also apply to any and all possible designs of the sealing member's, as described within this specification.

Figure 5A:
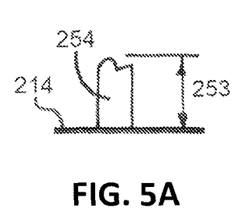
FIGS. 5A, 5B and 5C are alternative depictions of a protruding member.
Figure 5B:
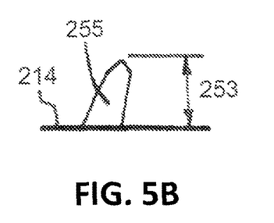
Figure 5C:
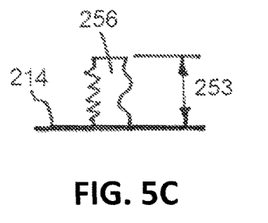

FIG. 5A is the side view of one alternative shape of the protruding member 254 which may be incorporated into this design. FIGS. 5A through 5C are specifically provided to demonstrate that the protruding member can take various shapes. FIG. 5A also depicts a effective height 253 of the protruding member 254, perpendicular to surface 214. One end of the protruding member 254 is solidly connected to and is an integral part of surface 214. These three examples (depicted in FIGS. 5A, 5B and 5C) indicate that said effective height 253 of all three said protruding member are identical regardless of their shape; their top surface details or their side details.

Other alternatives (not depicted) include the use of a combination of both said protruding members' and said protruding solid bodies' to provide the required means of functionality desired by the sealing member.

Figure 7:
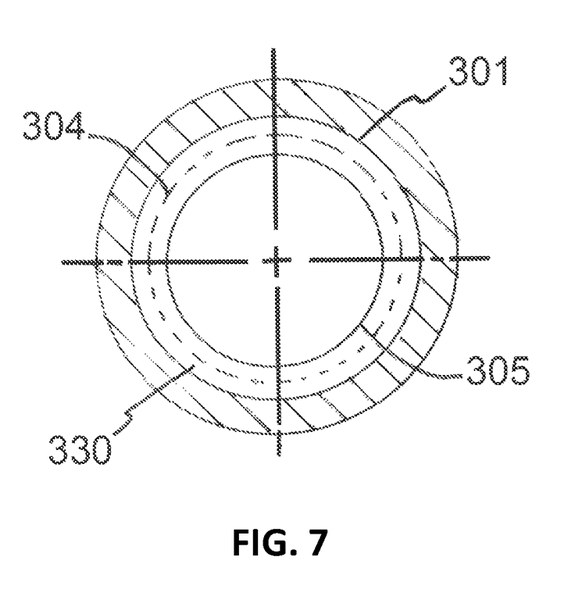
FIG. 7 is a cross sectional view taken along line 7-7 of FIG. 6 which details an sealing surface.

FIG. 7 is a cross sectional view taken along section 7-7 of FIG. 6. The purpose of this figure is to depict the respective sealing member and the female coupler sealing surface in plan view in its simplest form; two intersecting flat planes. The sealing member has been removed from this figure in order to provide clarity. This figure uses FIG. 6 components and depicts that a sealing area (the actual sealing surface only) is defined by the area that is formed between the: (1) larger circle (displayed with a dotted line) created as the extent of surface 304 as projected onto the female coupler 401 surface 330 and (2) smaller circle as defined by the smallest circle shown in FIG. 7 (which is the side view of surface 305). The surfaces 305 and 304 are shown in FIG. 7 as circular, which is only one of the typical and practical shapes that these surfaces may take, as they are not limited to circular shapes. The seal utilized may be one of a) a standard O-ring design, b) flat pliable seal design, c) a seal which relies on conforming materials, d) precision machining or any other typical methods as desired. The choice of a prior-art seal may have an effect on this improvements performance. If an appropriate prior-art seal is chosen, its effect will be minimal, as compared to the benefits of this invention; whereas if an inappropriate prior-art seal (magnets, fasteners or clasping features for example) is chosen, it may have an adverse effect on the intended benefits of this invention.

Figures 8A, 8B:
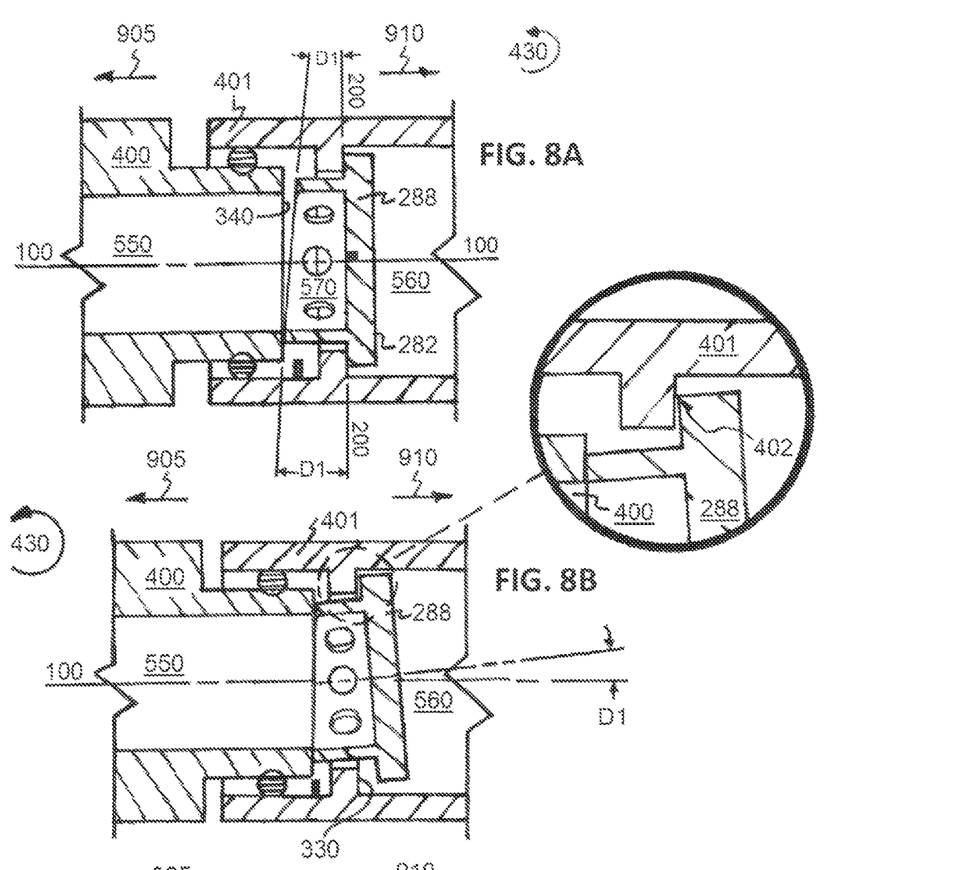
FIGS. 8A, 8B and 8C are sectional views along line 4-4 of FIG. 9 showing the components at three distinct positions of engagement of the quick-connect valve assembly.
Figure 8C:
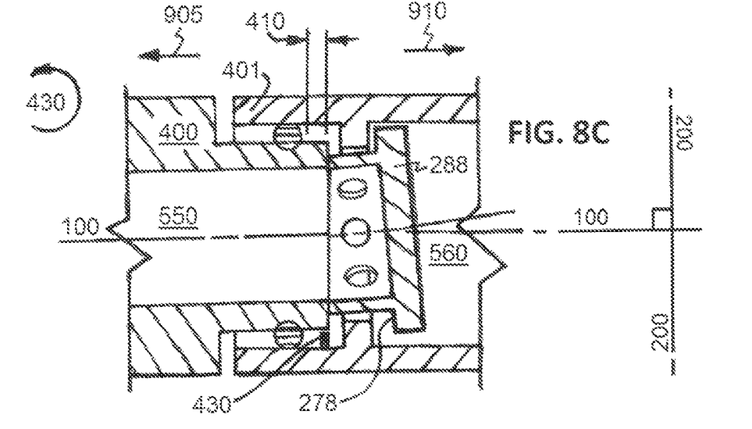

FIG. 6 and FIGS. 8A, 8B and 8C depict this invention at four operational positions detailing the rotation and the translation of the sealing member. The positions and the state of the valve is also depicted at each position. The four positions are as follows:

1) Position 1 is shown in FIG. 6, where the male coupler 400 in its pre-contact position and there is no contact with the sealing member 288, and hence, the valve is in the closed state and, 2) Position 2 is shown in FIG. 8A, where the male coupler 400 in its initial first contact stage with the sealing member 288, while the male coupler 400 imparts no movement or said coupling force on the sealing member 288 and hence, the valve remains in the closed state (as in Position 1), and, 3) Position 3 is shown in FIG. 8B, where the male coupler 400 in its highest surface contact position (with the sealing member 288), and the sealing member 288 is also in a completely rotated position (rotated to the constant dihedral angle D1), and hence, the valve is now in the partially-open state and lastly, 4) Position 4 is shown in FIG. 8C, where the male coupler 400 is in its final position, and hence, the valve is in the fully-opened state. The sealing member is fully rotated by the amount of the constant dihedral angle D1 and further translated 410 in the directions 430 and 910 respectively.

Position 1 is shown in FIG. 6, where the male coupler 400 is in its pre-contact position and there is no contact with the sealing member 288 and hence the valve is in the closed state. Where FIG. 6 is a cross-sectional view of the quick-connect valve assembly, taken from section 4-4 of FIG. 9, incorporates the second alternative of the sealing member 288 (as shown in FIG. 4B) as part of the quick-connect valve assembly. This particular alternative of the sealing member 288 is incorporated in FIG. 6 merely for ease of explanation, as its particular geometry is most simple to display in a cross-sectional view. FIG. 6 also details the components, including: the male coupler 400, the female coupler 401, the sealing member 288 and lastly a depiction of a radial seal 420.

In Position 1, fluid pressure exists within the 560 central chamber which is physically contained by surfaces 301, 282, 304 and 330 (FIG. 8B) and all of the surfaces of the typical hose 202 (as shown in FIG. 9). The pressure contained within the central chamber 550 is assumed to be at a lower value (approaching atmospheric pressure) then the pressure contained within central chamber 560, so in practice the pressure that exists within the central chamber 550 is considered negligible. The higher value of pressure which exists in the central chamber 560 causes movement of the sealing member 288 (in the direction 905) against the female coupler 401 and therefore, surfaces 330 (see FIG. 8B) and surface 278 (see FIG. 8C) are in direct contact (interfere) and provide the sealing area. The seal chosen for discussion purposes is the simplest form of seals and is detailed in FIG. 7. Since surfaces 330 and surface 278 are in full interference (contact), the valve remains in the closed state.

Position 2 is shown in FIG. 8A, where the male coupler 400 is in its initial contact stage with the sealing member 288, hence the valve remains in the closed state as it was in Position 1. As shown in Position 2, the male coupler 400 is translated in direction 910 along axis 100 (during its insertion into the stationary female coupler 401) from its original Position 1. The female coupler 401 is depicted as remaining stationary. At Position 2, the male coupler 400 initially contacts the sealing member 288, yet imparts no movement or said coupling force on the sealing member 288. The male coupler 400 makes initial contact with the sealing member 288 at the high point 251B (see FIG. 4B) of the sealing member 288. During its continued insertion into the female coupler 401 the male coupler 400 continues to translate further past Position 2 along axis 100 in direction 910. This continued translation causes rotation of the sealing member 288 in direction 430, due to the one point contact between the high point 251B (see FIG. 4B) of the sealing member 288 and surface 340 (see FIG. 8A) of the male coupler 288. This rotation of the sealing member 288 is centred approximately around the rotation point 402, as detailed in the magnified visual of FIG. 8B. The rotation point 402 is located approximately at the outmost edge (top left hand corner) of the male coupler 288 (see FIG. 8B); this is when the outer edge of the male coupler 288 makes contact with surface 330 (see FIG. 8B and FIG. 7). The male coupler 288 makes contact with surface 330 at the rotation point 402 on the arc, where surface 278 (see FIG. 8C) and surface 304 (see FIG. 4B) meet. The exact location of the rotation point 402 is physically dependent on the style of the radial seal (O-ring or other methods) used, although the rotation of the sealing member 288 will generally occur around the same region of the rotation point 402, as depicted. Hence, the exact location of the rotation point 402 has no material effect on the overall function of this invention although the rotation point 402 may be approximately located as described within.

Referring to FIG. 8A again, there exists a higher amount of pressure in the central chamber 560 than the pressure that typically exists in the central chamber 550 hence there is the static pressure differential, in direction 905 (in this case) across the sealing member 288. Initially, in both Positions 1 and Position 2, the closing force on the sealing member 288 in direction 905 is reacted (a force) by the female coupler reaction force (in the opposite direction; direction 910) exerted by the female coupler 401 over the sealing area. As the male coupler 400 is translated in direction 910 past Position 2, initial contact occurs only at high point 251B (see FIG. 4B) of the sealing member 288 (see FIG. 8B) and surface 340 (see FIG. 8A) of the male coupler 400. The initial contact results in a transfer of some portion of the female coupler reaction force to surface 340 of the male coupler 400. As the male coupler 400 is further translated in direction 910, past its last position (described above), the amount of the female coupler reaction force exerted by the female coupler 401 is further decreased and hence more of the closing force is transferred to surface 340 of the male coupler 400.

The coupling force exerted by the male coupler 400 increases as the translation of the male coupler 400 continues further again in direction 910. The coupling force and the female coupler force are both reactive forces. The amount of the coupling force exerted by the male coupler, continues to increase until a seal break angle (being considerably less than the constant dihedral angle D1) is reached and the valve enters the partially-open state, allowing fluid communication to occur between the central chamber 560 into the central chamber 550. Immediately prior to the sealing member 288 rotating to the seal break angle, the male coupler 400 and the female coupler 401 both impart approximately equal reaction forces (each reacts approximately half of the amount of the closing force) in direction 910, in order to react (resist) all of the closing force imparted by the sealing member 288 (in direction 905). In other words, the amount of the coupling force (in direction 910)

plus the amount of the female coupler reaction force (in direction 910) is equal to the amount of the closing force (in the opposite direction 905) just prior to the seal break angle being reached. Immediately prior to the seal break angle being reached (as described above) there remains the static pressure differential (no fluid flow) across the sealing member 288 and it's at this position that the coupling force is at a highest magnitude, which exists at all positions. This improvement results in the highest magnitude of the coupling force being approximately half of the highest magnitude of the typical coupling force (prior-art); under similar pressure conditions. Immediately after the seal break angle has been reached and fluid flow commences, the coupling force decreases in value as compared to the static pressure differential stage (as described above) due to the Pressure-Volume characteristics of typical fluids.

Position 3 is depicted in FIG. 8B. The high point 251B and the low point 252B define the downstream plane. The constant dihedral angle Theta2 is defined by the relative difference between the downstream plane and the upstream plane (plane defined by sealing surface 278 of FIG. 4B). The constant dihedral angle Theta2 is also referred to as the constant dihedral angle D1 within this specification. The sealing member 288 thus continues to rotate in direction 430 until it reaches Position 3 where the sealing member 288 has rotated to its maximum amount possible angle, the constant dihedral angle D1, and now surface 277 (see FIG. 4A) of the sealing member 288 is coincident (interferes) with surface 340 (see FIG. 8A) of the male coupler 400. At Position 3 contact remains at the interface between the sealing member 288 and the female coupler 401 (at the rotation point 402), and the value of the coupling force has decreased from its said highest magnitude. At Position 3 the closing force continues to ensure that the male coupler 400 and the sealing member 288 remain joined at their interfaces (surfaces 288 and 340). Any continued insertion of the male coupler 400, past Position 3 results in both the male coupler 400 and the sealing member 288 (although the sealing member remains in its previously rotated position) now moving together by translation only (in the direction 910 along axis 100) and the two components now behaving as they are now one object. The secondary linear translation of the sealing member is also unique in that the sealing member 288 is already rotated and then translated axially in an already rotated position along axis 100.

As, the two components are further translated past Position 3, in direction 910, the two components reach Position 4, as depicted in FIG. 8C. At Position 4 the translation of the two components ceases. At Position 4 the valve is depicted in the fully-opened state allowing an additional amount of fluid communication to occur from central chamber 560 and into central chamber 550. Any further translation of the two components is restricted by a typical stop 430 (FIG. 8C) and/or a typically integrated mechanism incorporating the typical stop 430 and a typical locking mechanism 430 (not depicted herein). The typical stop 430 and the typical locking mechanism 430, are only discussed as both features are typical features included in most typical quick-connect valve assemblies, although neither are considered unique features of this new design. The fluid communication continues to take place between Position 3 and Position 4 where the actual values of the closing force, the coupling force and fluid flow volumes are governed by the specific fluid's Pressure-Volume characteristics.

FIG. 9 is an external orthographic block view of the quick-connect valve assembly and section 4-4 is utilized in other figures.

FIGS. 10A, 10B and 10C are sectional views; along section 4-4 of FIG. 9 showing three alternative configurations of the quick-connect valve assembly, detailing the constant dihedral angle D1. These figures detail the upgrade path of utilizing prior-art components, with the addition of new component(s), in order to achieve the required overall geometry of this improvement. As compared to FIGS. 11A and 11C, which detail the upgrade path by the replacement of the prior-art components with new components, in order to achieve the required overall geometry of this improvement. FIGS. 10A and 10C are shown incorporating the typical sealing members' 600 (prior-art), and the typical male couplers' 400 (prior-art) to simply demonstrate how typical (prior-art) components can be upgraded, with the addition of the sliced hollow cylindrical shape (SHCS) component to either the typical sealing member or the typical male coupler. FIG. 10A details the upgrade path of utilizing the typical sealing member, with the addition of the SHCS component(s) which is attached, by alternative means, to the typical sealing member. FIG. 10C details the upgrade path of utilizing the typical male coupler, with the addition of the SHCS component(s) which are attached, by alternative means, to the typical male coupler. FIG. 10B details the introduction of one SHCS component, a wedge component.

The constant dihedral angle D1 should only be located at one physical location on the quick-connect valve assembly, as depicted in FIGS. 10A through 10C. Although more than one of the three alternatives could be implemented together it would then be necessary to restrict the relative circumferential rotation between all components. In practice, in most typical quick-connect valve assemblies, the circumferential relative movement is not restricted for reasons of ease of interchangeability considerations. In addition, there appears to be no practical advantage to incorporate more than one of the three alternative configurations into one quick-connect valve assembly. This design requirement of restriction of the relative circumferential rotation is easily implemented, by the addition of axial design features located on the components, and is described herein to take benefit of such.

The constant dihedral angle D1 is contained on the SHCS component and is defined as the relative angle between the upstream and downstream ends of the SHCS component. The three alternative configurations, as described in the previous paragraph, all contain the SHCS component, which is located sandwiched, in alternative positions, between the downstream end of the typical sealing member and the upstream end of the typical male coupler. This SHCS component is either attached to: the typical sealing member 600 or the typical male coupler 400 or is moveably mounted within the female housing. In all cases the SHCS component, ensures that the sealing member undergoes said rotation during the coupling process. The SHCS component is depicted in FIGS. 10A through 10C, although protruding members and/or other protruding solid bodies geometry could be utilized. The SHCS components' may also be constructed of any combination of protruding members' and/or protruding solid bodies' components, which in their entirety produces the required geometry which defines the constant dihedral angle D1.

FIG. 10A depicts the typical sealing member 600 with the SHCS component 610 attached, by alternative means, to the downstream end of the typical sealing member 600. The typical sealing member 600 contains a downstream end, having a flat plane 613 perpendicular to the axial direction, in the closed position. The SHCS component 610 contains an upstream end, having a flat plane 611, perpendicular to the axial direction 100, in the closed position and a downstream end, having a flat plane 612 located at the constant dihedral angle D1 between the two respective planes. The combination of the typical sealing member 600 and the SHCS component 610 creates one resultant solid body, which behaves as the sealing member, as an improvement, also depicted in FIG. 6 and FIGS. 8A through 8C. During the coupling process the upstream end 340 of the typical male coupler 400 contacts the downstream end 612 of the sealing member, to rotate the sealing member out of coaxial alignment with the female housing by the amount of the constant dihedral angle D1. When the constant dihedral angle D1 is located on the sealing member, the coupling process causes the sealing member to rotate in a similar fashion, as the alternative configurations do, which are detailed in the description of configurations depicted in FIGS. 8B, 10B and 10C. The coupling force is substantially reduced in this configuration depicted in FIG. 10A, as a result of the sealing member rotation, similar to the description of configuration depicted in FIG. 8B. The following components contain central chambers' [chamber label] to allow fluid communication; the typical male coupler 400 [550], the SHCS component 610 [580], the typical sealing member 600 [570] and the typical female coupler 401 [560].

FIG. 10B depicts the typical sealing member 600 and the typical male coupler 400, wherein the SHCS component 630 is contained within the downstream side of the female coupler. The SHCS component 630 is specifically named the wedge component 630 to provide a consistent naming convention within the claims section. In addition, the wedge component is an additional component that is introduced herein FIG. 10B and also in FIG. 11B. The wedge component 630 is moveably mounted within the female coupler body and is held captive, by alternative means to the female coupler body or by the extents of surfaces' of the wedge component, and the extents of the internal surfaces' of the female coupler. The typical sealing member 600 contains a downstream end, having a flat plane 613 perpendicular to the axial direction, in the closed position. The typical male coupler 400 contains an upstream end, having a flat plane 340 perpendicular to the axial direction. The wedge component 630 contains a flat plane 632 located on the upstream end, and a downstream end having a flat plane 631 located at the constant dihedral angle D1 between the two respective planes. During the coupling process the upstream end 340 of the typical male coupler 400 is in contact with an downstream end 631 of the wedge component 630, and the upstream end 632 of the wedge component 630 is in contact with the downstream end 613 of the typical sealing member 600. The constant dihedral angle D1 provides the means to ensure that the sealing member undergoes said rotation, out of coaxial alignment with the female housing, during the coupling process. When the constant dihedral angle D1 is located on the wedge component, the coupling process causes the sealing member to rotate in a similar fashion, as the alternative configurations do, which are detailed in the descriptions of FIGS. 8B, 10A and 10C. The coupling force is substantially reduced in this configuration depicted in FIG. 10B, as a result of the sealing member rotation, similar to the description of configuration depicted in FIG. 8B. The second dihedral angle D2 is simply the arbitrary angle that the upstream end 632 is positioned relative to the perpendicular to the axial direction. The following components contain central chambers' [chamber label] to allow fluid communication; the typical male coupler 400 [550], the wedge component 630 [590], the typical sealing member 600 [570] and the typical female coupler 401 [560].

FIG. 10C depicts the typical sealing member 600 and the typical male coupler 400, wherein the SHCS component 620, is attached by alternative means to the upstream end 340 of the typical male coupler 400. The typical male coupler 400 contains an upstream end, having a flat plane perpendicular to the axial direction. The SHCS component 620 contains an downstream end 621, having a flat plane, perpendicular to the axial direction and a upstream end, having a flat plane 622 located at the constant dihedral angle D1 between the two respective planes. The combination of the typical male coupler 400 and the SHCS component 620 creates one resultant solid body which behaves as the male coupler. During the coupling process the upstream end 622 of the SHCS component 620 is in contact with the downstream end 640 of the typical sealing member 600. The constant dihedral angle D1 provides the means to ensure that the sealing member undergoes said rotation, out of coaxial alignment with the female housing, during the coupling process. When the constant dihedral angle D1 is located on the male coupler 400, the coupling process causes the sealing member to rotate in a similar fashion, as the alternative configurations do, which are detailed in the description of the configurations depicted in FIGS. 8B, 10A and 10B. The coupling force is substantially reduced in this configuration depicted in FIG. 10C, as a result of the sealing member rotation, similar to the configuration of FIG. 8B. The following components contain central chambers' [chamber label] to allow fluid communication; the typical male coupler 400 [550], the SHCS component 620 [595], the typical sealing member 600 [570] and the typical female coupler 401 [560].

FIGS. 11A, 11B and 11C are sectional views along section 4-4 of FIG. 9 showing three alternative methods of implementing the quick-connect valve assembly improvements and detail the constant dihedral angle D1. FIGS. 11A and 11C detail the upgrade path by the replacement of the prior-art components with new components, in order to achieve the required overall geometry of this improvement. FIG. 11B details the utilizing of all prior-art components with the introduction of one new component. The improvements as detailed in FIG. 11B, are effectively the same as that described in FIG. 10B although FIG. 11B utilizes unique component numbering.

The constant dihedral angle D1 should only be located at one physical location on the quick-connect valve assembly as depicted in FIGS. 11A through 11C. Although, more than one of the three alternatives could be implemented together, it would then be necessary to restrict the relative circumferential rotation between all components. In practice, in most typical quick-connect valve assemblies, the circumferential relative movement is not restricted for ease of interchangeability considerations. In addition, there appears to be no practical advantage to incorporate more than one of the three alternative configurations into one quick-connect valve assembly. The design requirement of restriction of the relative circumferential rotation is easily implemented, by the addition of axial design features located on the components, and is described herein to take benefit of such.

Figure 11:
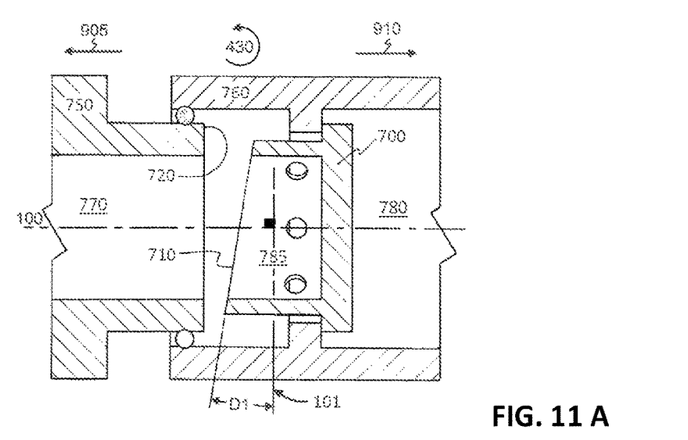

FIG. 11A details the upgrade path of the replacement, of the typical sealing member (prior-art) with the sealing member 700. The SHCS component is depicted in FIG. 11A for the sealing member, although its physical geometry can, alternately utilize protruding members and/or other protruding solid bodies as shown in FIGS. 4A through 4C. The use of protruding members and/or other protruding solid bodies, as an alternative to the SHCS component can also be utilized for the wedge component (FIG. 11B) and the male coupler (FIG. 11C). The SHCS component may also, be constructed of any combination of protruding members' and/or protruding solid bodies' components, which in their entirety produces the required geometry which, defines the constant dihedral angle D1. FIG. 11A depicts the sealing member 700 with a downstream end having a flat plane 710 located at the constant dihedral angle D1 perpendicular to the axial direction, in the closed position. This alternative is similar to the general description of FIG. 8B although utilizes unique part numbers for consistency of all of FIG. 11. During the coupling process, the upstream end 720 of the typical male coupler 750 contacts the downstream end 710 of the sealing member 700, to initially rotate the sealing member out of coaxial alignment with the female housing by the amount of the constant dihedral angle D1. When the constant dihedral angle D1 is located on the sealing member 700, the coupling process causes the sealing member to rotate in a similar fashion, as the alternative configurations do, which are detailed in the description of configurations depicted in FIGS. 8B, 11B and 11C. The coupling force is substantially reduced in this configuration depicted in FIG. 11A, as a result of the sealing member rotation, similar to the configuration of FIG. 8B. The following components contain central chambers' [chamber label] to allow fluid communication; the typical male coupler 750 [770], the sealing member 700 [785] and the typical female coupler 760 [780].

FIG. 11B depicts the typical sealing member 800 and the typical male coupler 850, wherein the SHCS component 830 is contained within the downstream side of the female coupler. This alternative is similar to that detailed in the description of FIG. 10B although FIG. 11B utilizes unique component numbering for all of FIG. 11. In addition, the wedge component is an additional component that is introduced herein FIG. 11B and also in FIG. 10B. The wedge component 830 is moveably mounted within the typical female coupler body 860 and is held captive, by alternative means to the female coupler body or by the extents of surfaces' of the wedge component, and the extents of the internal surfaces' of the female coupler. The typical sealing member 800 contains a downstream end, having a flat plane 813 perpendicular to the axial direction, in the closed position. The typical male coupler 850 contains an upstream end, having a flat plane 820 perpendicular to the axial direction. The wedge component 830 contains a flat plane 832 on the upstream end, and a downstream end having a flat plane 831 located at the constant dihedral angle D1 between the two respective planes. During the coupling process the upstream end 820 of the typical male coupler 850 is in contact with an downstream end 831 of the wedge component 830, and the upstream end 832 of the wedge component 830 is in contact with the downstream end 813 of the typical sealing member 800. The constant dihedral angle D1 provides the means to ensure that the sealing member undergoes said rotation, out of coaxial alignment with the female housing, during the coupling process. When the constant dihedral angle D1 is located on the wedge component, the coupling process causes the sealing member to rotate in a similar fashion, as the alternative configurations do, which are detailed in the description of configurations depicted in FIGS. 8B, 11A and 11C. The coupling force is substantially reduced in this configuration depicted in FIG. 11B, as a result of the sealing member rotation, similar to the configuration of FIG. 8B. The second dihedral angle D2 is simply, the arbitrary angle that the upstream end 832 is positioned relative to the perpendicular to the axial direction. The following components contain central chambers' [chamber label] to allow fluid communication; the typical male coupler 850 [870], the wedge component 830 [795], the typical sealing member 800 [765] and the typical female coupler 860 [880].

FIG. 11C details the upgrade path of the replacement of the typical male coupler, (prior-art) with the male coupler 950. FIG. 11C depicts the typical sealing member 900 wherein the typical sealing member 900, contains a flat downstream plane 910, which is perpendicular to the axis 100, in the closed position. The male coupler 950 having an upstream end, having a flat plane 920 located at the constant dihedral angle D1 relative to the perpendicular of the axial direction. During the coupling process, the upstream end 920 of the male coupler 950 is in contact with the downstream end 910 of the typical sealing member 900. The constant dihedral angle D1 provides the means to ensure that the sealing member undergoes said rotation, out of coaxial alignment with the female housing, during the coupling process. When the constant dihedral angle D1 is located on the male coupler, the coupling process causes the sealing member to rotate in a similar fashion, as the alternative configurations do, which are detailed in the description of configurations depicted in FIGS. 8B, 11A and 11B. The coupling force is substantially reduced in this configuration depicted in FIG. 11C, as a result of the sealing member rotation, similar to the configuration of FIG. 8B. The following components contain a central chamber [chamber label] to allow fluid communication; the male coupler 950 [970], the typical sealing member 900 [765] and the typical female coupler 960 [980].

The improvement results in the highest magnitude of the coupling force being significantly less than the highest magnitude of the prior-art coupling force under similar operating conditions. The exact amount of improvement that can be achieved in practice can be confirmed by lab experiments and or simulations, by physical replacement or addition of components as described herein. Due to the reduction in the coupling force the coupling time is reduced and hence the ease of use may also be improved.

Since, the highest magnitude of the coupling force is usually exerted by a human operator, and since all humans have maximum physical force limitations, the improvement offered by this invention provides dramatic improvement in consumer usability. This new design is of particular benefit in fluid systems which utilize higher pressure fluid levels. High fluid pressure levels exist in most residential or commercial pressured systems including fluid delivery systems.

In addition, it is understood that whilst the improvement (containing the sealing member) is particularly useful in quick-connect valve assemblies operated by humans, that its benefits are also applicable in uses of automation such as robots and other automation.

Utilizing a standard cylindrical coordinate system with axial [typical Z direction], radial [typical Euclidean radial distance from Z axis] and circumferential [angular] directions; where the axial direction coincides with the direction 910 and the direction 905; the axis of the axial direction is depicted as line 100 on FIGS. 3, 6, 8A, 8B and 8C, 10A to 10C and 11A to 11C; where the radius [R] has a value of zero at the axial [Z] axis 100; hence the resulting circumferential direction coincides with the standard circumferential direction of the coordinate system. Directions' 200 and 101 are both perpendicular to the axial direction 100. As depicted in FIG. 6 the direction 910 and direction 905 are also defined as the upstream direction and the downstream direction, respectively. The downstream direction is the direction of the flow of fluid in the quick-connect valve assembly.

The invention claimed is:

1. A quick-connect valve assembly for fluid control comprising:
a male coupler having a first central chamber; a female coupler having a second central chamber and an annular sealing surface in the second central chamber; a radial fluid seal between an outer diameter of the male coupler and an inside diameter of the female coupler; a sealing member contained within the female coupler; wherein the male coupler and the female coupler undergo a coupling process and an uncoupling process, having a coupled state and an uncoupled state; wherein the first central chamber and the second central chamber enables fluid communication; and wherein the sealing member is held in a closed position by an internal upstream static pressure within said second central chamber of the female coupler to prevent fluid flow in the uncoupled state, wherein the sealing member is coaxial with the female housing in the closed position; the male coupler having an upstream end having a flat plane perpendicular to an axial direction of the valve assembly; and wherein the sealing member has an annular sealing surface plane at an upstream portion perpendicular to the axis of the female coupler in the closed position and a flat plane on the downstream end, the two respective planes forming a constant dihedral angle, wherein during the coupling process the upstream end of the male coupler contacts the downstream end of the sealing member to initially rotate the constant dihedral angle of the sealing member out of coaxial alignment with the female housing by pivoting the annular sealing surface plane on the annular sealing surface, and then in the fully open position lift the sealing member in the axial direction of the valve assembly out of contact with the annular sealing surface.

2. A quick-connect valve assembly for fluid control comprising: a male coupler having a first central chamber; a female coupler having a second central chamber and an annular sealing surface in the second central chamber; a radial fluid seal between an outer diameter of the male coupler and an inside diameter of the female coupler; a sealing member contained within the female coupler; wherein the male coupler and the female coupler undergo a coupling process and an uncoupling process, having a coupled state and an uncoupled state; wherein the first central chamber and the second central chamber enables fluid communication; and wherein the sealing member is held in a closed position by an internal upstream static pressure within said second central chamber of the female coupler to prevent fluid flow in the uncoupled state; wherein the sealing member is coaxial with the female housing in the closed position; the male coupler having an upstream end having a flat plane perpendicular to an axial direction of the valve assembly; wherein the sealing member has an annular sealing surface plane at an upstream portion perpendicular to the axis of the female coupler in the closed position and a flat plane perpendicular to the axis of the sealing member on the downstream end; further comprising a wedge component, moveably mounted and contained within the female coupler, having a third central chamber which enables fluid communication; wherein the wedge component is positioned, between a downstream end of the sealing member and the upstream end of the male coupler; and wherein the wedge component contains an upstream end having a first flat plane at a first dihedral angle to an axial direction of the valve assembly and a downstream end having a second flat plane at a second dihedral angle relative to the first dihedral angle, the first and second planes forming a constant dihedral angle, wherein during the coupling process the upstream end of the male coupler contacts the downstream end of the wedge component and the upstream end of the wedge component contacts the downstream end of the sealing member to initially rotate the constant dihedral angle of the sealing member out of coaxial alignment with the female coupler by pivoting the annular sealing surface plane on the annular sealing surface, and then in the fully open position lift the sealing member in the axial direction of the valve assembly out of contact with the annular sealing surface.

3. A quick-connect valve assembly for fluid control comprising: a male coupler having a first central chamber; a female coupler having a second central chamber and an annular sealing surface in the second central chamber; a radial fluid seal between an outer diameter of the male coupler and an inside diameter of the female coupler; a sealing member contained within the female coupler; wherein the male coupler and the female coupler undergo a coupling process and an uncoupling process, having a coupled state and an uncoupled state; wherein the first central chamber and the second central chamber enables fluid communication; and wherein the sealing member is held in a closed position by an internal upstream static pressure within said second central chamber of the female coupler to prevent fluid flow in the uncoupled state; wherein the sealing member is coaxial with the female housing in the closed position; and wherein the sealing member has an annular sealing surface plane at an upstream portion perpendicular to the axis of the female coupler in the closed position and a first flat plane perpendicular to the axis of the sealing member on the downstream end, wherein the male coupler upstream end contains a second flat plane where the first and second planes forming a constant dihedral angle, wherein during the coupling process the upstream end of the male coupler contacts the downstream end of the sealing member to initially rotate the constant dihedral angle of the sealing member out of coaxial alignment with the female housing by pivoting the annular sealing surface plane on the annular sealing surface, and then in the fully open position lift the sealing member in the axial direction of the valve assembly out of contact with the annular sealing surface.

* * * * *